(12) United States Patent
Liu

(10) Patent No.: US 12,491,745 B2
(45) Date of Patent: Dec. 9, 2025

(54) VEHICLE VIBRATION DAMPING SYSTEM

(71) Applicant: TOYOTA JIDOSHA KABUSHIKI KAISHA, Toyota (JP)

(72) Inventor: Yanqing Liu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 18/631,805

(22) Filed: Apr. 10, 2024

(65) Prior Publication Data
US 2024/0359521 A1    Oct. 31, 2024

(30) Foreign Application Priority Data

Apr. 26, 2023   (JP) ................. 2023-072446

(51) Int. Cl.
*B60G 17/018*   (2006.01)
(52) U.S. Cl.
CPC ................. *B60G 17/018* (2013.01)
(58) Field of Classification Search
CPC ...... B60G 17/018; B60G 17/06; B60G 17/08; B60G 2202/25; B60G 2400/252; B60G 2400/91; B60G 2500/10; B60G 2600/182; B60G 2800/162; B60G 17/0182; F16F 15/002; F16F 2228/001
See application file for complete search history.

(56) References Cited

U.S. PATENT DOCUMENTS

| | | | |
|---|---|---|---|
| 8,938,333 B2* | 1/2015 | Bose ................. | B60G 17/0165 701/37 |
| 2010/0207344 A1* | 8/2010 | Nakamura ............ | B60G 13/16 280/124.108 |
| 2019/0241038 A1* | 8/2019 | Katsuyama ...... | B60G 17/01908 |
| 2022/0176766 A1* | 6/2022 | Kikuchi ............... | B60G 17/016 |

FOREIGN PATENT DOCUMENTS

| | | | |
|---|---|---|---|
| JP | 2012111360 A | * | 6/2012 |
| JP | 2016104605 A | * | 6/2016 |
| JP | 2019-135120 A | | 8/2019 |

OTHER PUBLICATIONS

Machine Translation of JP 2016104605 A PDF File Name: "JP2016104605A_Machine_Translation.pdf" (Year: 2016).*
Machine Translation of JP 2012111360 A PDF File Name: "JP2012111360A_Machine_Translation.pdf" (Year: 2012).*

* cited by examiner

*Primary Examiner* — Lindsay M Low
*Assistant Examiner* — Ruben Picon-Feliciano
(74) *Attorney, Agent, or Firm* — Dinsmore & Shohl LLP

(57) ABSTRACT

A vehicle vibration damping system includes a suspension; an actuator; and a control device configured to calculate a damping force to be applied to the sprung structure based on a theory of skyhook control, and control the actuator. The control device calculates the damping force based on a correction control parameter obtained by multiplying a control parameter of a denominator of a transfer function of the sprung structure with respect to a road surface displacement of a vibration model having a virtual skyhook damper (Continued)

by a function for canceling a coefficient of a control parameter term. The control parameter is a product of an attenuation coefficient of the skyhook damper and a Laplace operator. The function is a function having a coefficient of the control parameter term of the transfer function as a denominator, and includes at least a quadratic term of the Laplace operator in a numerator.

2 Claims, 5 Drawing Sheets

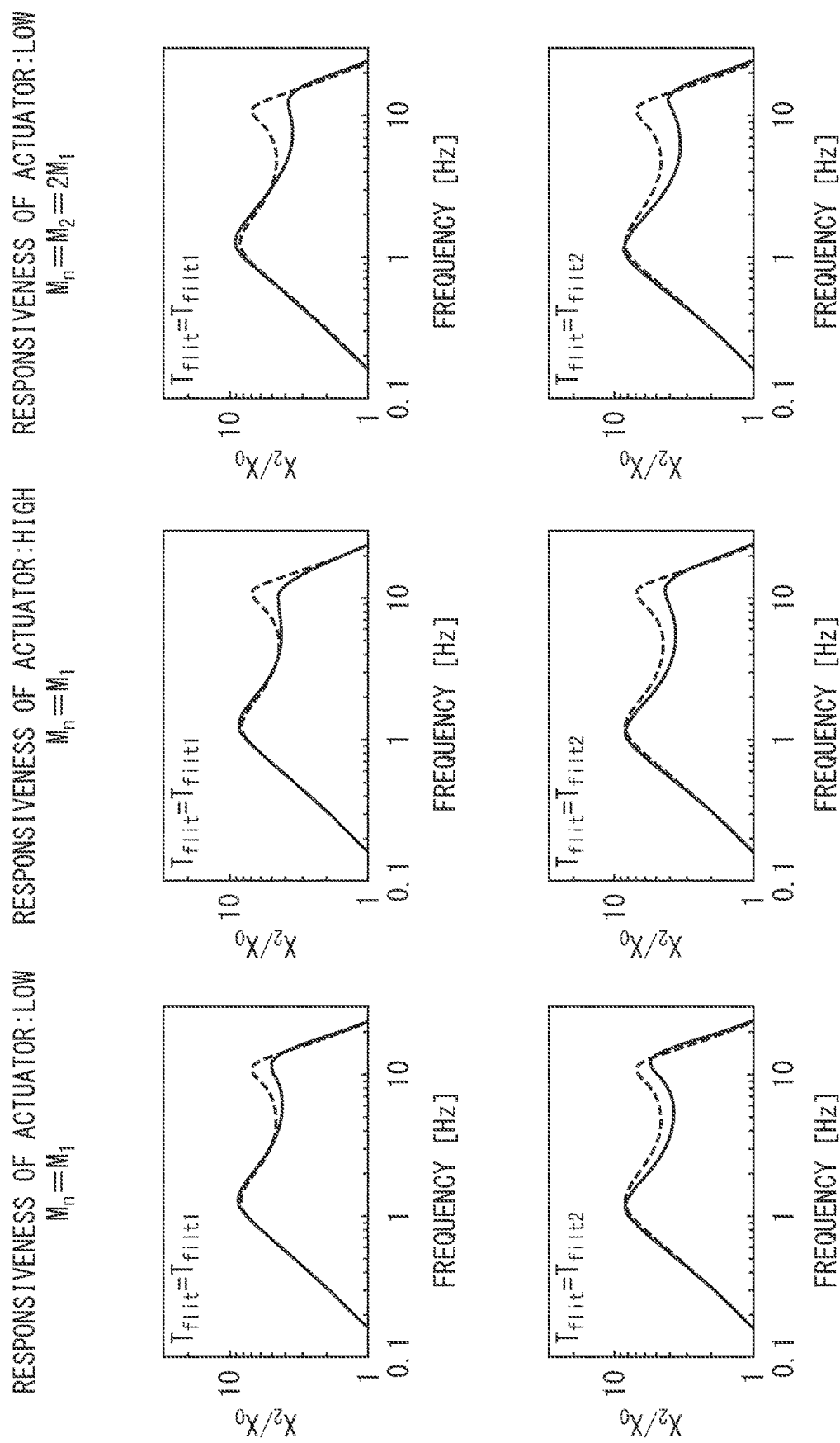

VEHICLE VIBRATION DAMPING SYSTEM

CROSS-REFERENCE TO RELATED APPLICATIONS

This application claims priority to Japanese Patent Application No. 2023-072446 filed Apr. 26, 2023, the entire contents of which are herein incorporated by reference.

FIELD

The present disclosure relates to a vehicle vibration damping system.

BACKGROUND

JP2019-135120A discloses a conventional vehicle vibration damping control device configured to calculate a target damping force to be applied to a sprung structure (vehicle body) on the basis of a theory of skyhook control, and control an actuator applying a vertical control force between an unsprung structure (wheel) and the sprung structure on the basis of the target damping force.

SUMMARY

The above-described conventional vehicle vibration damping control device has room for improvement with respect to a vibration damping performance in the vicinity of an unsprung resonance frequency where a fixed point is present.

The present disclosure has been made focusing on such problems, and an object thereof is to improve the vibration damping performance in the vicinity of the unsprung resonance frequency where the fixed point is present.

In order to solve the above problem, a vehicle vibration damping system according to an aspect of the present disclosure comprises: a suspension configured to connect an unsprung structure including a tire and an sprung structure including a vehicle body; an actuator configured to apply a vertical control force between the unsprung structure and the sprung structure; and a control device configured to calculate a damping force to be applied to the sprung structure on the basis of a theory of skyhook control, and control the actuator on the basis of the damping force.

The control device is configured to calculate the damping force based on a correction control parameter obtained by multiplying a control parameter of a denominator of a transfer function of the sprung structure with respect to a road surface displacement of a vibration model having a virtual skyhook damper by a function for canceling a coefficient of a control parameter term. The control parameter is a product of an attenuation coefficient of the skyhook damper and a Laplace operator. The function is a function having a coefficient of the control parameter term of the transfer function as a denominator, and includes at least a quadratic term of the Laplace operator in a numerator.

According to this aspect of the present disclosure, the vibration damping performance in the vicinity of the unsprung resonance frequency in which the fixed point is present can be improved.

BRIEF DESCRIPTION OF DRAWINGS

FIG. 4A is a view showing a change in a transfer characteristic due to a difference in responsiveness of an actuator when a function $T_{filt1}$, $T_{filt2}$ are used as a correcting function when the responsiveness of the actuator is low.

FIG. 4B is a view showing a change in a transfer characteristic due to a difference in responsiveness of an actuator when a function $T_{filt1}$, $T_{filt2}$ are used as a correcting function when the responsiveness of the actuator is high.

FIG. 4C is another view showing a change in a transfer characteristic due to a difference in responsiveness of an actuator when a function $T_{filt1}$, $T_{filt2}$ are used as a correcting function when the responsiveness of the actuator is low.

DESCRIPTION OF EMBODIMENTS

Figure 1:
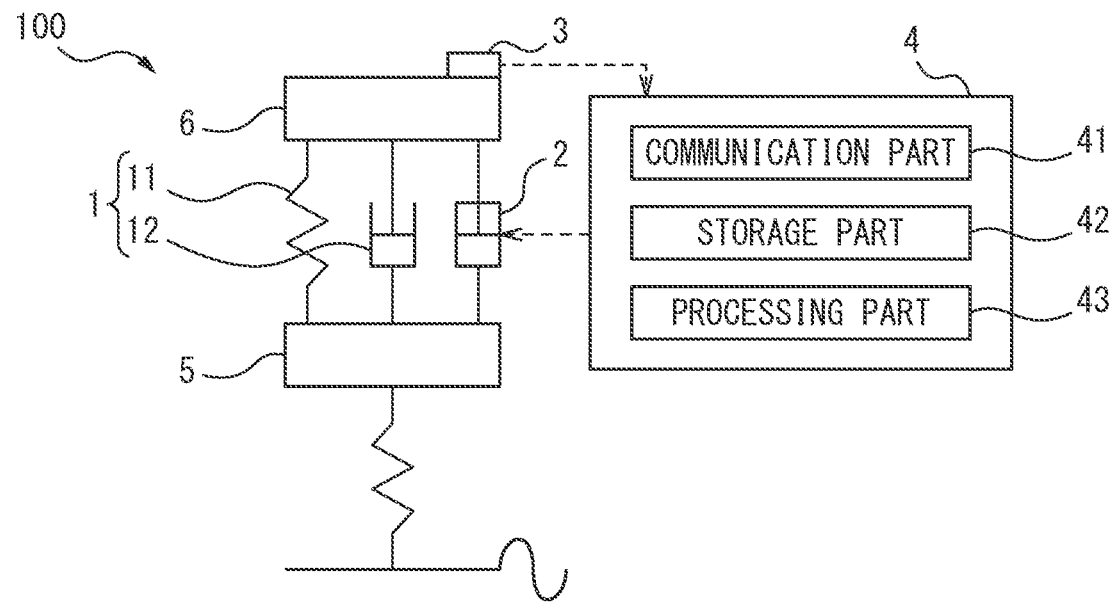
FIG. 1 is a schematic view of a vehicle vibration damping system according to an embodiment of the present disclosure.

Below, referring to the drawings, an embodiment of the present disclosure will be explained in detail. Note that, in the following explanation, similar component elements will be assigned the same reference notations.

FIG. 1 is a schematic view of a vehicle vibration damping system 100 according to an embodiment of the present disclosure.

The vehicle vibration damping system 100 is provided with a suspension 1, an actuator 2, sensors 3, and a control device 4.

The suspension 1 is provided with a suspension spring 11 and a shock absorber 12, and connects an unsprung structure 5 including a tire and a sprung structure 6 including a vehicle body.

The actuator 2 controls the stroke amount of the suspension 1 by applying a vertical control force between the unsprung structure 5 and the sprung structure 6. The actuator 2 according to the present embodiment is, for example, an electric or hydraulic actuator 2, and generates a damping force calculated based on a theory of skyhook control. The shock absorber 12 may function as the actuator 2 by using the shock absorber 12 as a damping force variable type.

The sensors 3 acquire various types of data necessary for controlling the actuator 2. The sensors 3 include, for example, an acceleration sensor that detects the vertical acceleration of the vehicle body.

The control device 4 is an ECU (electronic control unit) provided with a communication part 41, storage part 42, and processing part 43.

The communication part 41 is provided with an interface circuit for connecting the control device 5 to the actuator 2 and the sensors 3. The communication part 41 supplies data received from the sensors 3 to the processing part 43.

The storage part 42 has an HDD (hard disk drive) or SSD (solid state drive), semiconductor memory, or other storage medium and stores various computer programs used for processing at the processing part 43.

The processing part 43 has one or more CPUs (central processing units) and their peripheral circuits. The processing part 43 runs various computer programs stored in the storage part 52 and, for example, is a processor. The processing unit 43, and thus the control device 4, uses various kinds of data received from the sensors 3, calculates the damping force to be applied to the sprung structure 6 based on the theory of skyhook control, and controls the actuator 2 based on the calculated damping force.

Figure 2:
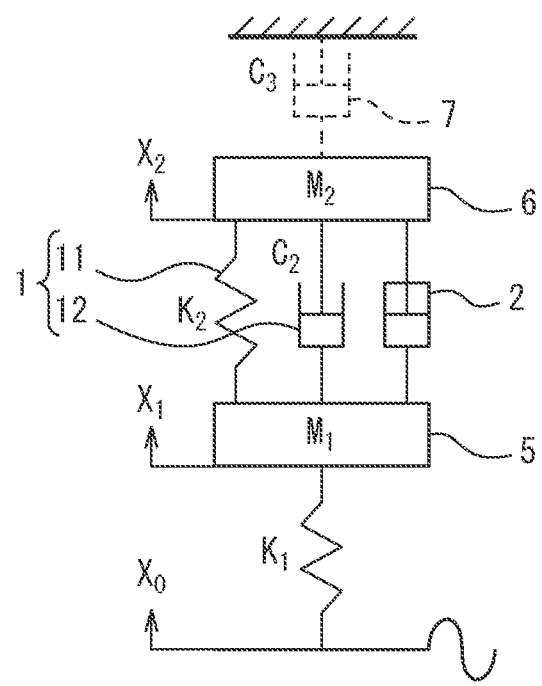
FIG. 2 is a view showing a two-degree of freedom vibration model provided with a virtual skyhook damper.

FIG. 2 is a view showing a two-degrees of freedom vibration model of a single wheel provided with a virtual skyhook damper 7.

In FIG. 2, $X_0$ is road surface displacement, $X_1$ is unsprung displacement, $X_2$ is the sprung displacement, $M_1$ is unsprung mass, $M_2$ is sprung mass, $K_1$ is a spring constant of the tire, $K_2$ is a spring constant of the suspension spring 11, $C_2$ is a damping coefficient of the shock absorber 12, and $C_3$ is a damping coefficient of the skyhook damper 7. The equation of motion of the two-degrees of freedom vibration model can be expressed by the following equations (1) and (2).

[Mathematical 1]

$$M_1 \ddot{X}_1 = -K_2(X_1 - X_2) - C_2(\dot{X}_1 - \dot{X}_2) + C_3 \dot{X}_2 + K_1(X_0 - X_1) \quad (1)$$

$$M_2 \ddot{X}_2 = K_2(X_1 - X_2) + C_2(\dot{X}_1 - \dot{X}_2) - C_3 \dot{X}_2 \quad (2)$$

Equations (1) and (2) can be expressed as in equations (3) and (4) below by Laplace transforming and putting $C_3 \cdot s = T_{sky0}$. Note that "s" is a Laplace operator.

[Mathematical 2]

$$M_1 s^2 X_1 = -K_2(X_1 - X_2) - C_2 s(X_1 - X_2) + T_{sky0} X_2 + K_1(X_0 - X_1) \quad (3)$$

$$M_2 s^2 X_2 = K_2(X_1 - X_2) - C_2 s(X_1 - X_2) + T_{sky0} X_2 \quad (4)$$

A transfer function G(s) of the sprung displacement with respect to the road surface displacement can be expressed from equations (3) and (4) as in equation (5).

[Mathematical 3]

$$G(s) = \frac{X_2}{X_0} = \frac{K_1(K_2 + C_2 s)}{(M_2 s^2 + K_2 + C_2 s + T_{sky0})(M_1 s^2 + K_1 + K_2 + C_2 s) - (K_2 + C_2 s)(K_2 + C_2 s + T_{sky0})} \quad (5)$$

When equation (5) is modified to summarize $T_{sky0}$ terms of the denominator, equation (6) below is obtained.

[Mathematical 4]

$$G(s) = \frac{K_1(K_2 + C_2 s)}{(M_2 s^2 + K_2 + C_2 s)(M_1 s^2 + K_1 + K_2 + C_2 s) - (K_2 + C_2 s)^2 + T_{sky0}(M_1 s^2 + K_1)} \quad (6)$$

When s=iω is set in equation (5) or equation (6), the transfer function G(s) becomes as shown in equation (7) below when $M_1 s^2 + K_1 = 0$, that is, when the unsprung resonant frequency $f_0 = \omega/2\pi = \sqrt{(K1/M1)}/2\pi$. That is, the transfer function G(s) becomes constant regardless of the control parameter $T_{sky0}$. That is, the frequency $f_0$ becomes the fixed point frequency, and when frequency is in the frequency $f_0$, even if control force F $(=T_{sky0} \cdot X_2)$ is generated by the actuator 2, the transfer function G(s) cannot be affected. The frequency $f_0$ is a frequency around 10 [Hz] in the present embodiment.

[Mathematical 5]

$$G(s) = \frac{X_2}{X_0} = \frac{K_1}{M_2 s^2} = -\frac{M_1}{M_2} \quad (7)$$

Therefore, in the present embodiment, control force F $(=T_{sky} \cdot X_2)$ of the actuator 2 is calculated using a correction control parameter $T_{sky}$ obtained by multiplying the control parameter $T_{sky0}$ by correction function $T_{filt}$ for canceling the $(M_1 s^2 + K_1)$ of the third term (control parameter term) of the denominator of equation (6) so that the transfer function G(s) can be influenced even at the fixed point frequency.

The correction control parameter $T_{sky}$ can be expressed as in the following equation (8), where the transfer function G(s) is as in the following equation (9).

[Mathematical 6]

$$T_{sky} = T_{sky0} T_{filt} \quad (8)$$

$$G(s) = \frac{K_1(K_2 + C_2 s)}{(M_2 s^2 + K_2 + C_2 s)(M_1 s^2 + K_1 + K_2 + C_2 s) - (K_2 + C_2 s)^2 + T_{sky}(M_1 s^2 + K_1)} \quad (9)$$

As the correction function $T_{filt}$, for example, the respective function $T_{filt0}$, $T_{filt1}$, $T_{filt2}$ shown in equation (10) to equation (12) can be considered, but as a result of intensive studies by the inventors, it has been found that the damping performance of the high frequency band in the vicinity of the frequency $f_0$ can be improved by using the function $T_{filt1}$ shown in equation (11) or the function $T_{filt2}$ shown in equation (12). A coefficient $M_n$ of the second-order term of the Laplacian operator and a coefficient $C_n$ of the first-order term of the Laplacian operator of the numerator of equations (11) and (12) are constants set in advance by experimentation and the like, respectively.

[Mathematical 7]

$$T_{filt0} = \frac{K_1}{M_1 s^2 + K_1} \quad (10)$$

-continued $$T_{filt1} = \frac{K_1 + M_n s^2}{M_1 s^2 + K_1} \quad (11)$$

$$T_{filt2} = \frac{K_1 + C_n s + M_n s^2}{M_1 s^2 + K_1} \quad (12)$$

Figure 3A:
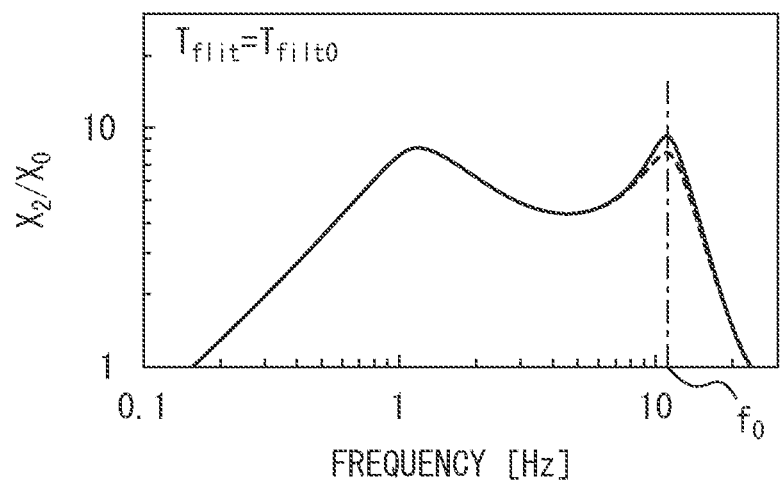
FIG. 3A is a view showing a transfer characteristic of sprung displacement with respect to road surface displacement when a respective function $T_{filt0}$ is used as a correcting function.
Figure 3B:
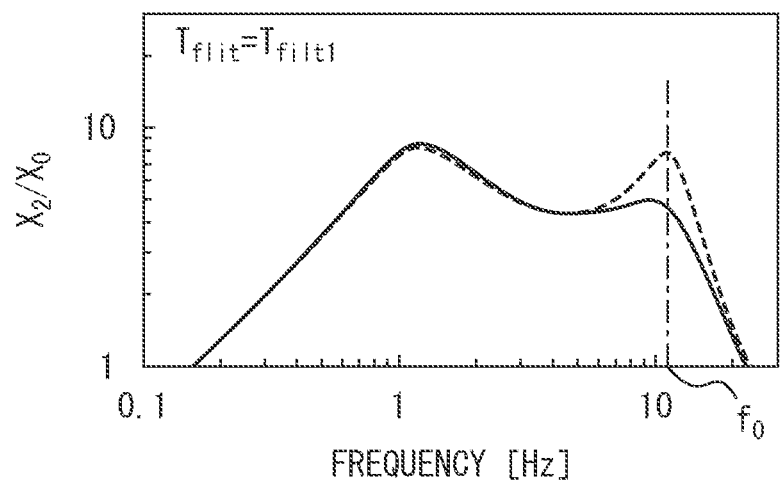
FIG. 3B is a view showing a transfer characteristic of sprung displacement with respect to road surface displacement when a respective function $T_{filt1}$ is used as a correcting function.
Figure 3C:
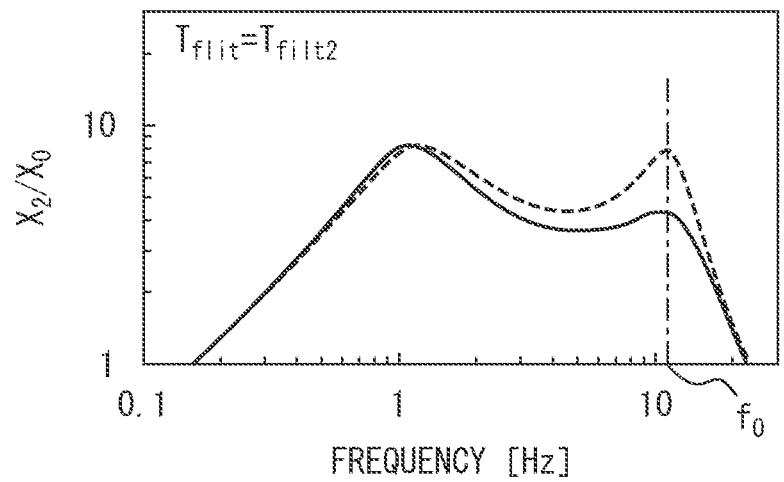
FIG. 3C is a view showing a transfer characteristic of sprung displacement with respect to road surface displacement when a respective function $T_{filt2}$ is used as a correcting function.

FIGS. 3A-3C are views showing transfer characteristics of the sprung displacement $X_2$ with respect to the road surface displacement $X_0$ when the respective function $T_{filt0}$, $T_{filt1}$, $T_{filt2}$ are used as the correction functions. In FIGS. 3A-3C, for comparison, the transfer characteristic when the correction function is not used, that is, the transfer characteristics of Equation (6), are indicated by broken lines.

As shown in FIGS. 3A-3C, it can be seen that the transfer characteristic in the frequency $f_0$ does not become a constant value by using the correction function, and the transfer characteristic is changed by the control force F of the actuator 2 in the fixed point frequency band (the frequency band near 10 [Hz] in the present embodiment) near the frequency $f_0$.

However, as shown in FIG. 3A, when the function $T_{filt0}$ is used as the correction function, the damping performance of the fixed point frequency band is conversely deteriorated in the frequency band up to approximately 30 [Hz] at which the damping effect can be obtained by the vehicle damping system 100, and the damping performance of the frequency band other than the fixed point frequency band is not changed.

On the other hand, as shown in FIG. 3B, when using the function $T_{filt1}$ having a second-order term of the Laplace operator as the correction function, it can be seen that to improve the damping performance of the high-frequency band including the fixed point frequency band.

Then, as shown in FIG. 3C, when the function $T_{filt2}$ further having a first-order term of the Laplace operator is used as the correction function, it can be seen that the damping performance of the medium frequency band (the frequency band in the vicinity of 1 to 10 [Hz] in the present embodiment) can be improved in addition to the high frequency band including the fixed point frequency band.

Therefore, in the present embodiment, the function $T_{filt1}$ or the function $T_{filt2}$ is used as the correction function. Due to this, when the function $T_{filt1}$ is used as the correction function, the damping performance of the high frequency band including the fixed point frequency band can be improved. When the function $T_{filt2}$ is used as the correction function, the damping performance of the medium frequency band in addition to the high frequency band including the fixed point frequency band can also be improved.

Next, the change in the transfer characteristic due to the difference in the responsiveness of the actuator 2 will be described with reference to FIGS. 4A-4C.

FIGS. 4A-4C is a view showing the change in the transfer characteristic due to the difference in responsiveness of an actuator 2 when a function $T_{filt1}$, $T_{filt2}$ are used as the correction function. In FIGS. 4A-4C, for comparison, the transfer characteristic when the correction function is not used, that is, the transfer characteristics of Equation (6), are indicated by broken lines.

FIG. 4A is a view showing transfer characteristics when the responsiveness of the actuator 2 is low, and FIG. 4B is a view showing transfer characteristics when the responsiveness of the actuator 2 is high. The coefficient $M_n$ of the second-order term of the Laplace operator of the numerator of the respective function $T_{filt1}$, $T_{filt2}$ used in FIG. 4A and FIG. 4B is a predetermined value $M_1$.

FIG. 4C is a view showing transfer characteristics when the responsiveness of the actuator 2 is low as in FIG. 4A, but is a view when the coefficient $M_n$ of the second-order term of the Laplace operator of the respective function $T_{filt1}$, $T_{filt2}$ is changed to a predetermined value $M_2$ which is twice the value of $M_1$.

As shown in FIGS. 4A and 4B, when the responsiveness of the actuator 2 is low, it can be seen that the damping performance is deteriorated as compared with the case where the responsiveness of the actuator 2 is high.

On the other hand, as shown in FIG. 4C, it can be seen that the damping performance can be improved even when the responsiveness of the actuator 2 is low by increasing the coefficient $M_n$ of the second-order term of the Laplace operator of the numerator of the respective functional $T_{filt1}$, $T_{filt2}$.

Therefore, the damping performance can be improved by setting the value of the coefficient $M_n$ of the second-order term of the Laplace operator of the numerator of the respective functional $T_{filt1}$, $T_{filt2}$ to an appropriate value based on the responsiveness of the actuator 2.

In designing the respective function $T_{filt1}$, $T_{filt2}$, the unsprung mass $M_1$ and the spring constant $K_1$ of the tire are designed according to the tire to be actually used in the vehicles. However, an error occurs between a design value and an actual value. Further, since the tire and the like may be replaced, the error is likely to occur between the design value and the actual value.

FIGS. 5A and 5B and FIGS. 6A and 6B show transfer characteristics obtained when the design value is made smaller than the actual value and when the design value is made larger in anticipation of the occurrence of such an error.

Figure 5A:
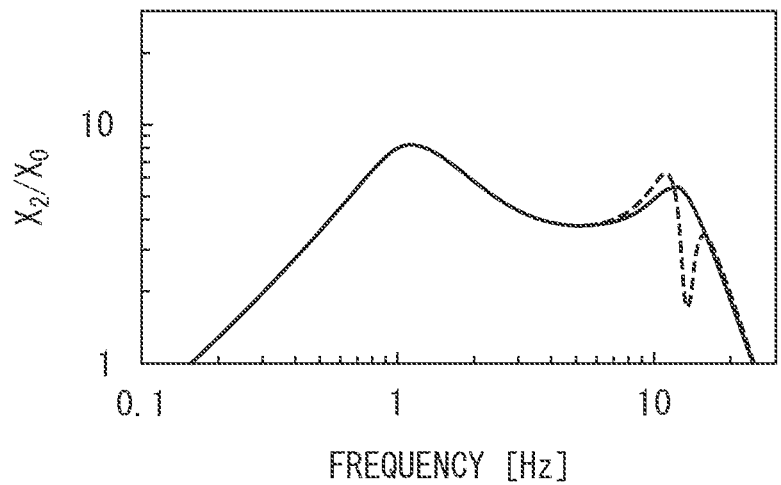
FIG. 5A is a view comparing a transfer characteristic when an unsprung mass $M_1$ is set to the actual value and a transfer characteristic when the unsprung mass $M_1$ is set to be smaller than the actual value.
Figure 5B:
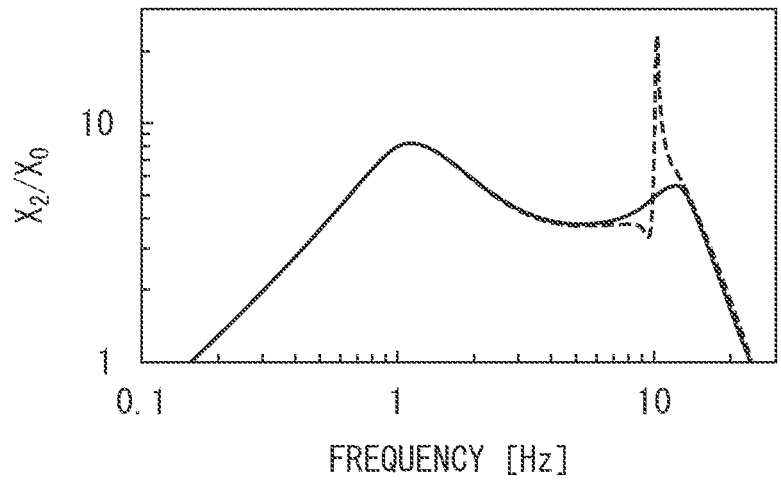
FIG. 5B is a view comparing a transfer characteristic when an unsprung mass $M_1$ is set to the actual value and a transfer characteristic when the unsprung mass $M_1$ is set to be larger than the actual value.
Figure 6A:
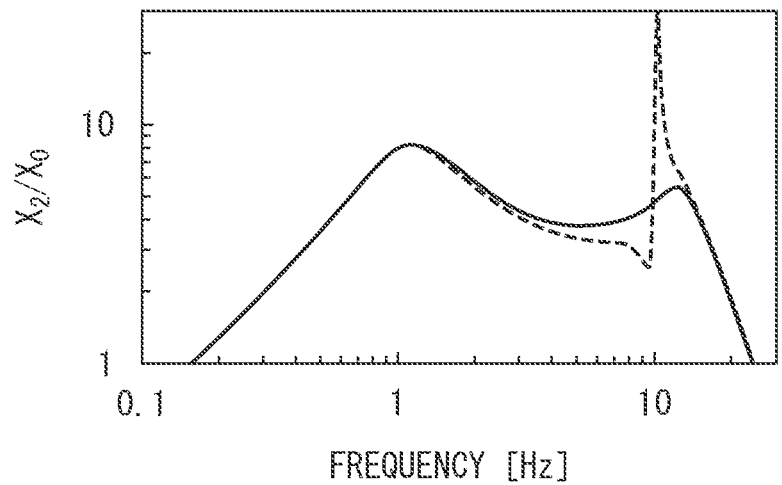
FIG. 6A is a view comparing a transfer characteristic when a spring constant $K_1$ of a tire is set to the actual value and a transfer characteristic when the spring constant $K_1$ of the tire is set to be smaller than the actual value.
Figure 6B:
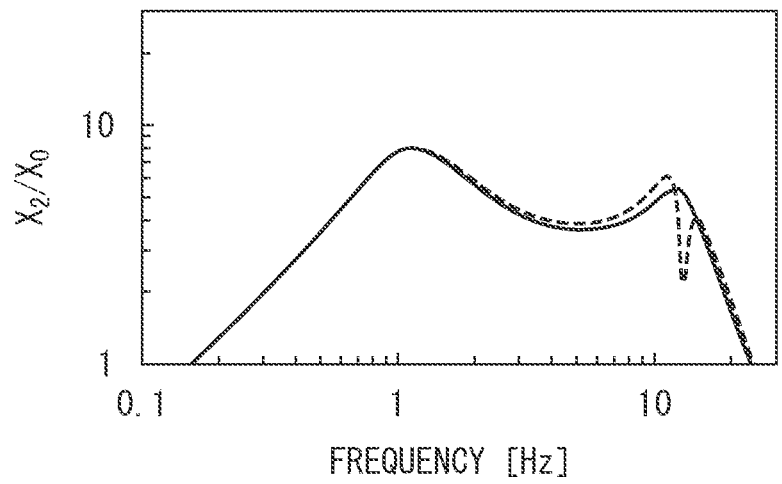
FIG. 6B is a view comparing a transfer characteristic when a spring constant $K_1$ of a tire is set to the actual value and a transfer characteristic when the spring constant $K_1$ of the tire is set to be larger than the actual value.

Specifically, FIG. 5A is a view showing a transfer characteristic (solid line) in a case where the unsprung mass $M_1$ is made to be equal to the actual value, and a transfer characteristic (broken line) in a case where the unsprung mass $M_1$ is made smaller than the actual value. FIG. 5B is a view showing a transfer characteristic (solid line) in a case where the unsprung mass $M_1$ is set to be equal to the actual value and a transfer characteristic (broken line) in a case where the unsprung mass $M_1$ is set to be larger than the actual value. FIG. 6A is a view showing a transfer characteristic (solid line) when the spring constant $K_1$ of the tire is made equal to the actual value, and a transfer characteristic (broken line) when the spring constant $K_1$ of the tire is made smaller than the actual value. FIG. 6B is a view showing a transfer characteristic (solid line) when the spring constant $K_1$ of the tire is made to be equal to the actual value, and a transfer characteristic (broken line) when the spring constant $K_1$ of the tire is made larger than the actual value.

As shown in FIG. 5A, when the unsprung mass $M_1$ is made smaller than the actual value, the damping performance of the high frequency band including the fixed point frequency band is improved as compared with the case where the unsprung mass $M_1$ is made equal to the actual value. On the other hand, as shown in FIG. 5B, when the unsprung mass $M_1$ is larger than the actual value, the damping performance of the high frequency band including the fixed point frequency band is deteriorated as compared with the case where the unsprung mass $M_1$ is set to the actual value.

In contrast, as shown in FIG. 6A, when the spring constant $K_1$ of the tire is made smaller than the actual value, the damping performance of the high frequency band including the fixed point frequency band is deteriorated as compared with the case where the spring constant $K_1$ of the tire is made equal to the actual value. On the other hand, as shown in FIG. 6B, when the spring constant $K_1$ of the tire is set to be larger than the actual value, the damping performance of the high frequency band including the fixed point frequency band is improved as compared with the case where the spring constant $K_1$ of the tire is set to be equal to the actual value.

Therefore, with respect to the unsprung mass $M_1$ in designing the respective function $T_{filt1}$, $T_{filt2}$, by keeping the damping performance within an allowable range by using a value larger than the actual value, even if an error occurs between the design value and the actual value, the actual value is basically smaller than the design value, and thus the damping performance can be kept within an allowable range. On the other hand, with respect to the spring rate $K_1$ of the tire in designing the respective function $T_{filt1}$, $T_{filt2}$, by keeping the damping performance within an allowable range by using a value smaller than the actual value, even if an error occurs between the design value and the actual value, the actual value basically becomes larger than the design value, and thus the damping performance can be kept within an allowable range.

The vehicle vibration damping system 100 according to the present embodiment described above is provided with the suspension 1 configured to connect the unsprung structure 5 including the tire and the sprung structure 6 including the vehicle body, the actuator 2 configured to apply a vertical control force between the unsprung structure 5 and the sprung structure 6, and the control device 4 configured to calculate a damping force to be applied to the sprung structure 6 on the basis of the theory of skyhook control, and control the actuator on the basis of the damping force. The control device 4 is configured to calculate the damping force based on a correction control parameter $T_{sky}$ obtained by multiplying a control parameter $T_{sky0}$ of a denominator of a transfer function G(s) of the sprung structure 6 with respect to a road surface displacement of the two-degree of freedom vibration model (vibration model) having the virtual skyhook damper 7 by the correction function $T_{filt}$ (function) for canceling a coefficient ($M_1s^2+K_1$) of a control parameter term. The control parameter $T_{sky0}$ is a product of the damping coefficient $C_3$ of the skyhook damper 7 and the Laplace operator "s". The correction function $T_{filt}$ is a function having the coefficient ($M_1s^2+K_1$) of the control parameter term of the transfer function G(s) as a denominator, that is, the function $T_{filt1}$ including at least a second-order term of a Laplace operator in the numerator, or the function $T_{filt2}$ further including a first-order term of a Laplace operator in the numerator.

Due to this, when the function $T_{filt1}$ is used as the correction function, the damping performance of the high frequency band including the fixed point frequency band can be improved. When the function $T_{filt2}$ is used as the correction function, the damping performance of the medium frequency band in addition to the high frequency band including the fixed point frequency band can also be improved.

Above, embodiments of the present disclosure were explained, but the embodiments only show some of the examples of application of the present disclosure and are not intended to limit the technical scope of the present disclosure to the specific constitutions of the embodiments.

For example, in the above described embodiment, in the two degree of freedom vibration model of FIG. 2, the spring constant $K_1$ of the tire is considered, but the damping coefficient $C_1$ of the tire is not considered. On the other hand, when the damping coefficient $C_1$ of the tire is considered, the coefficient of the control parameter term of the transfer function becomes $M_1s^2+C_1 \cdot s+K_1$, and thus the respective function $T_{filt1}$, $T_{filt2}$ are expressed by the following equations (13) and (14).

[Mathematical 8]

$$T_{filt1} = \frac{K_1 + M_n s^2}{M_1 s^2 + C_1 s + K_1} \quad (13)$$

$$T_{filt2} = \frac{K_1 + C_n s + M_n s^2}{M_1 s^2 + C_1 s + K_1}. \quad (14)$$

The invention claimed is:

1. A vehicle vibration damping system comprising:
   a suspension configured to connect an unsprung structure including a tire and a sprung structure including a vehicle body;
   an actuator configured to apply a vertical control force between the unsprung structure and the sprung structure; and
   an electronic control unit configured to calculate a damping force to be applied to the sprung structure on a basis of a theory of skyhook control, and control the actuator on a basis of the damping force, wherein
   the electronic control unit is configured to calculate the damping force based on a correction control parameter obtained by multiplying a control parameter of a denominator of a transfer function of the sprung structure with respect to a road surface displacement of a vibration model having a virtual skyhook damper by a function for canceling a coefficient of a control parameter term, and
   the control parameter is a product of a damping coefficient of the virtual skyhook damper and a Laplace operator, and
   the function is a function having a coefficient of the control parameter term of the transfer function as a denominator, and includes at least a second-order term of the Laplace operator in a numerator,
   wherein, in the vibration model, when mass of the unsprung structure is $M_1$, a spring constant of the tire is $K_1$, a damping coefficient of the tire is $C_1$, the Laplacian operator is s, and a coefficient $M_n$ is a predetermined constant, the function is expressed by Equation (1) or Equation (2) below;

$$\frac{K_1 + M_n s^2}{M_1 s^2 + K_1} \quad (1)$$

$$\frac{K_1 + M_n s^2}{M_1 s^2 + C_1 s + K_1}. \quad (2)$$

2. A vehicle vibration damping system comprising:
   a suspension configured to connect an unsprung structure including a tire and a sprung structure including a vehicle body;
   an actuator configured to apply a vertical control force between the unsprung structure and the sprung structure; and
   an electronic control unit configured to calculate a damping force to be applied to the sprung structure on a basis of a theory of skyhook control, and control the actuator on a basis of the damping force, wherein the electronic control unit is configured to calculate the damping force based on a correction control parameter obtained by multiplying a control parameter of a denominator of a transfer function of the sprung structure with respect to a road surface displacement of a vibration model having a virtual skyhook damper by a function for canceling a coefficient of a control parameter term, and the control parameter is a product of a damping coefficient of the virtual skyhook damper and a Laplace operator, and the function is a function having a coefficient of the control parameter term of the transfer function as a denominator, and includes at least a second-order term of the Laplace operator in a numerator, wherein, in the vibration model, when mass of the unsprung structure is $M_1$, a spring constant of the tire is $K_1$, a damping coefficient of the tire is $C_1$, the Laplacian operator is s, and a coefficient $M_n$ and a coefficient $C_n$ are predetermined constants, the function is expressed by Equation (3) or Equation (4) below;

$$\frac{K_1 + C_n s + M_n s^2}{M_1 s^2 + K_1} \quad (3)$$

$$\frac{K_1 + C_n s + M_n s^2}{M_1 s^2 + C_1 s + K_1}. \quad (4)$$

* * * * *